(12) United States Patent
Li et al.

(10) Patent No.: US 10,872,101 B2
(45) Date of Patent: Dec. 22, 2020

(54) DISTRIBUTED DATABASE PROCESSING METHOD AND DEVICE

(71) Applicant: Huawei Technologies Co., Ltd., Shenzhen (CN)

(72) Inventors: Zhenfeng Li, Shenzhen (CN); Li Yao, Shenzhen (CN); Wei Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 291 days.

(21) Appl. No.: 15/943,348

(22) Filed: Apr. 2, 2018

(65) Prior Publication Data

US 2018/0225353 A1 Aug. 9, 2018

Related U.S. Application Data

(63) Continuation of application No. PCT/CN2016/082375, filed on May 17, 2016.

(30) Foreign Application Priority Data

Nov. 26, 2015 (CN) .......................... 2015 1 0843773

(51) Int. Cl.
*G06F 16/00* (2019.01)
*G06F 16/27* (2019.01)
(Continued)

(52) U.S. Cl.
CPC ........ *G06F 16/278* (2019.01); *G06F 16/2272* (2019.01); *G06F 16/2282* (2019.01); *G06F 16/2471* (2019.01); *G06F 16/24534* (2019.01)

(58) Field of Classification Search
CPC ............. G06F 16/2272; G06F 16/2282; G06F 16/24534; G06F 16/2471; G06F 16/278; G06F 16/173; G06F 12/0802
(Continued)

(56) References Cited

U.S. PATENT DOCUMENTS 6,810,427 B1 * 10/2004 Cain .................... H04L 49/3009
709/238
7,477,843 B1 * 1/2009 Peeters .............. H04Q 11/0062
398/49
(Continued)

FOREIGN PATENT DOCUMENTS

CN 102025550 A 4/2011
CN 102043726 A 5/2011
(Continued)

*Primary Examiner* — Vincent F Boccio
(74) *Attorney, Agent, or Firm* — Slater Matsil, LLP

(57) ABSTRACT

Embodiments of the present invention relate to the field of storage technologies, and provide a distributed database processing method. A database processing device receives an access request; obtains, from a partition routing table of the data table according to the query index field and the value of the query index field, partition information and a value that correspond to the query index field; and sends, according to the partition information and the value of the partition information that correspond to the query index field and the value of the query index field, the access request to a database corresponding to the partition information and the value of the partition information.

15 Claims, 8 Drawing Sheets

(51) Int. Cl.
*G06F 16/22* (2019.01)
*G06F 16/2458* (2019.01)
*G06F 16/2453* (2019.01)

(58) Field of Classification Search
USPC .......................................................... 707/741
See application file for complete search history.

(56) References Cited

U.S. PATENT DOCUMENTS

| | | | |
|---|---|---|---|
| 10,057,343 B2 * | 8/2018 | Howard | .............. G06F 12/0802 |
| 10,579,618 B1 * | 3/2020 | Strahan | ................. G06F 16/248 |
| 2010/0281017 A1 | 11/2010 | Hu et al. | |
| 2014/0358987 A1 * | 12/2014 | Howard | .............. H04L 67/1095 |
| | | | 709/203 |
| 2015/0286681 A1 | 10/2015 | Baer et al. | |

FOREIGN PATENT DOCUMENTS

| | | |
|---|---|---|
| CN | 102375853 A | 3/2012 |
| CN | 104462430 A | 3/2015 |
| CN | 105512200 A | 4/2016 |
| JP | 2013134522 A | 7/2013 |

* cited by examiner

DISTRIBUTED DATABASE PROCESSING METHOD AND DEVICE

CROSS-REFERENCE TO RELATED APPLICATIONS

This application is a continuation of International Application No. PCT/CN2016/082375, filed on May 17, 2016, which claims priority to Chinese Patent Application No. 201510843773.0, filed on Nov. 26, 2015. The disclosures of the aforementioned applications are hereby incorporated by reference in their entireties.

TECHNICAL FIELD

The present invention relates to the field of storage technologies, and in particular, to a distributed database processing method and device.

BACKGROUND

With a sharp increase in a quantity of users of application systems, development of the Internet, and centralization of IT construction, centralized database systems are increasingly incapable of satisfying development requirements for large-data-amount storage and massive concurrent access. Distributed data systems are flourishing. In particular, currently, a De-IOE campaign is rising in the computer industry. Therefore, database devices are more commonly installed in X86 hosts, disk array devices are not used, and open source databases (such as MySQL) are more commonly selected. As a result, data becomes more decentralized, and an aspect of data processing performance is highlighted. In a distributed database system, data is stored according to a partition rule.

During data query or update, if a distributed database in which data is located can be directly positioned according to search criteria and SQL processing can be initiated for the database, the quickest response performance can be obtained. Otherwise, when a distributed database in which data is located cannot be determined, SQL processing needs to be initiated for each distributed database in a system before a correct result can be obtained. When there is a large quantity of distributed databases in a system, this processing not only consumes performance, but also increases a response delay, causing decrease in user satisfaction.

Specifically, in a current system, when a data table is to be stored into multiple distributed databases, a rule is to be followed, and this rule is referred to as a partition rule. Otherwise, data cannot be managed. Currently, a usual practice in the industry is that, a function operation (such as Hash) is performed according to a field (or some fields) (referred to as a partition field below) in the data table, then modulo operation is performed on a quantity of databases by using an operation result, and records of different modulus values are stored by using different distributed databases. As shown in FIG. 1, a Hash operation is performed on a field col1 in a to-be-stored data table, then modulo operation is performed on a quantity m of databases by using a Hash value, and records of different modulus values are stored in distributed databases with corresponding sequence numbers. Certainly, there is another data partition rule. For example, interval division is performed on a function operation result range of a field and even a range of a field, and data in different intervals is stored by using different sub-databases. In the foregoing process of storing data records in a data table into multiple distributed databases according to a partition rule, a field used for partitioning is referred to as a partition field such as the field col1.

Data is distributed and stored according to a function calculation result of a partition field (or some partition fields) (such as the field col1). Therefore, when a user queries the data or updates the data, if search criteria of an SQL statement include these partition fields, the same function operation may be performed according to values of the partition fields. Therefore, a distributed database in which the data is located may be determined by using the calculation result, so that a result can be obtained after the SQL statement is sent to the distributed database for processing. For example, if a user SQL statement is: select name from tables where col1='abc', an application program may perform a Hash operation according to a value 'abc' of a query index field col1 of the SQL statement, then determine an SQL processing database according to both an operation result and a partition rule, and then send an SQL statement to a corresponding distributed database for processing.

To obtain quick processing performance, usually, a user is required to add a partition field to search criteria of an SQL statement. Otherwise, a system needs to send the SQL statement to each distributed database for processing. In this way, although an anticipated result can be obtained, a response delay and performance consumption are obviously not optimal. However, in many practical scenarios, it is impossible to make a user add a partition field to search criteria of an SQL statement, and consequently, an access delay of data is very long.

SUMMARY

Embodiments of the present invention provide a distributed database storage and access method and device, to resolve a technical problem that when using a non-partition field to access a database, a user needs to send an access request to all databases for processing.

To achieve the foregoing objective, the following technical solutions are used in embodiments of the present invention.

According to a first aspect, a distributed database processing method is provided. The method includes receiving, by a database processing device, a first access request. The first access request includes a first query index field, a value of the first query index field, and a to-be-accessed first target field. The first query index field is non-partition information of a first data table. To avoid having the first access request sent to all distributed databases for processing, the database processing device obtains, from a partition routing table of the first data table according to the first query index field and the value of the first query index field, partition information and a value that correspond to the first query index field. For example, the database processing device may send a query request to a database that stores the partition routing table of the first data table, and receive a query result from the database that stores the partition routing table of the first data table, so as to obtain partition information and a value that correspond to the first query index field. The partition routing table stores a correspondence between each partition information of the first data table and a value of the partition information and each of the non-partition information of the first data table and a value of the non-partition information. The method includes sending, according to the partition information and the value of the partition information that corresponds to the first query index field and the value of the first query index field, the first access request to a database corresponding to the partition information and the value of the partition information. The database processing device splits the first data table according to partition information and a partition rule, and stores the split first data table into multiple databases. Specifically, the partition information includes a partition field or a partition carrying field, and a mapping relationship exists between the partition carrying field and the partition field. The partition carrying field may be generated by the partition field according to a preset conversion rule. For example, the partition carrying field may include a character string prefix and a character string suffix. The character string prefix is the partition field, and the character string suffix is a sequential number. The mapping relationship exists between the partition carrying field and the partition field. Therefore, a database to which an access statement needs to be sent can be determined according to the partition carrying field and the partition rule. According to the solutions provided in the embodiments of this application, when a query index field in a first access request does not include partition information, a value of partition information corresponding to a value of the query index field may be determined according to a partition routing table corresponding to a first data table, and then the first access request is sent, according to the value of the partition information, to a corresponding database for processing. A problem that the first access request needs to be sent to all databases for processing is avoided, effectively reducing a delay of an access response and also reducing system performance consumption.

With reference to the first aspect, in a first possible implementation of the first aspect, the searching a partition routing table of the first data table for partition information and a value that correspond to the first query index field may include: obtaining a partition routing table associated with the first data table; determining, according to the first query index field, a partition routing table that is associated with the first query index field and that is in the partition routing table associated with the first data table; and searching the partition routing table associated with the first query index field for the partition information and the value of the partition information that correspond to the first query index field. When multiple partition routing tables exist for the first data table, there is no need to query all partition routing tables. The partition routing table associated with the first query index field may be directly queried, thereby increasing a speed of querying for the partition information and the value of the partition information that correspond to the first query index field and the value of the first query index field, and further reducing the delay of the access response.

With reference to the first aspect and the first possible implementation of the first aspect, in a second possible implementation of the first aspect, the sending, according to the partition information and the value of the partition information that correspond to the first query index field and the value of the first query index field, the first access request to a database corresponding to the partition information and the value of the partition information includes: updating the first access request according to the partition information and the value of the partition information that correspond to the first query index field and the value of the first query index field, where an updated first access request includes the partition information, the value, and the to-be-accessed first target field; and sending the updated first access request to the database corresponding to the partition information and the value of the partition information. After the first access request is updated, existing processing logic of the database processing device may not need to be modified, and the updated first access request may be directly processed according to the existing processing logic.

With reference to the first aspect and the first and the second possible implementations of the first aspect, in a third possible implementation of the first aspect, before the receiving a first access request, the method further includes: receiving an insertion request. The insertion request includes to-be-inserted data, and the to-be-inserted data includes the value of the partition information. The method further includes receiving the value of the first query index field, and a value of the to-be-accessed first target field; inserting the to-be-inserted data into a partition table of the database according to the value of the partition information; determining that the partition routing table associated with the first query index field exists; and inserting the value of the first query index field and the value of the partition information into the partition routing table associated with the first query index field. When partition table data is inserted, partition routing table data is synchronously inserted, to keep the partition routing table data synchronous with the partition table data, so that when subsequently accessing the data table by using non-partition information, a user can obtain the corresponding partition information and the value of the partition information according to the partition routing table.

With reference to the first aspect and the first to the third possible implementations of the first aspect, in a fourth possible implementation of the first aspect, the method further includes: receiving a second access request, where the second access request includes a second query index field, a value of the second query index field, and a to-be-accessed second target field. The second query index field is partition information of a second data table. The method further includes sending, according to the second query index field and the value of the second query index field, the second access request to a corresponding database for processing. When a query index field in an access request received by the database processing device is partition information, the database processing device may directly send, according to the query index field and a value of the query index field, the access request to a corresponding database for processing. In particular, when the second query index field is a partition carrying field, according to the prior art, the second access request is sent to all distributed databases for processing. However, when the technical solutions provided in embodiments of the present invention are used, the second access request is prevented from being sent to all the distributed databases for processing, thereby effectively reducing a delay of an access response and also reducing system performance consumption.

According to a second aspect, an embodiment of the present invention provides a distributed database processing device. The database processing device has a function of implementing behavior of the database processing device in the foregoing first aspect. The function may be implemented by hardware, or may be implemented by hardware by executing corresponding software. The hardware or software includes one or more modules corresponding to the foregoing function.

In a possible design, a structure of the database processing device includes a processor and a memory. The memory is configured to store a program that supports the database processing device to perform the foregoing method, and the processor is configured to execute the program stored in the memory. The database processing device may further include a communications interface by using which the database processing device communicates with another device or a communications network.

According to a third aspect, an embodiment of the present invention provides a computer storage medium, configured to store a computer software instruction used by the foregoing database processing device. The computer software instruction includes a program designed for executing the database processing device in the foregoing first aspect.

Optionally, the partition information in the foregoing first aspect specifically includes a partition field and/or a partition carrying field.

In specific implementation, the database processing device may be an application, a DDS, or a device into which an application and a DDS are integrated.

Compared with a current system, in the solutions provided in embodiments of the present invention, when a user uses a non-partition field to access a database, an access request can be prevented from being sent to all distributed databases for processing, effectively reducing a delay of a customer response and also greatly reducing system performance consumption.

These aspects or another aspect in the present invention are more concise and easily understandable in descriptions in the following embodiments.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

To make the objectives, technical solutions, and advantages of the present invention clearer, the following further describes the embodiments of the present invention in detail with reference to the accompanying drawings.

Figure 2:
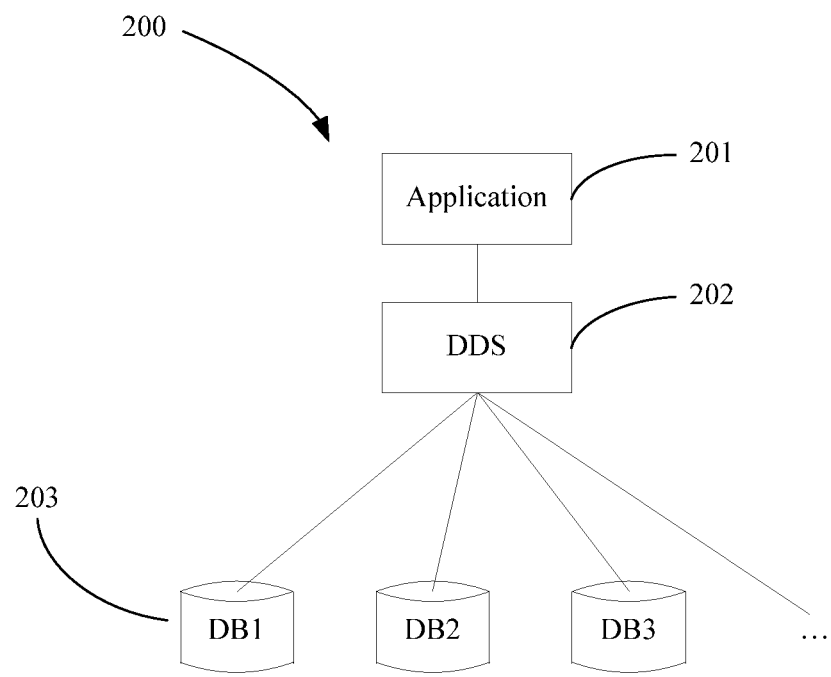
FIG. 2 is a running architecture of a distributed database system according to an embodiment of the present invention.

FIG. 2 shows a running architecture of a distributed database system related to an embodiment of the present invention. The running architecture 200 of the distributed database system includes an application program application 201, a distributed data service (DDS) middleware 202, and a distributed database 203 (such as a DB1, a DB2, or a DB3). The application 201 may be any application program that needs to access a distributed database, for example, a CRM (customer relationship management) system in the telecommunications industry, or a commodity subscription system of Vmall.com. The DDS 202 includes two running forms: an independent process running form (acting as an independently running apparatus) and an embedded running form (acting as a function module of the application 201). Embodiments of the present invention do not limit a specific running form of the DDS. The application 201 transparently performs operation(s) on the distributed database such as the DB1, the DB2, or the DB3 by using the DDS 202. For the application 201, the distributed databases DB1, DB2, and DB3 are logically a unified entity, and physically separately stored in different physical nodes. When receiving an access request sent by the application 201, the DDS 202 needs to determine a distributed database (that is, the DB1, the DB2, or the DB3) to which the access request is to be sent. In the running architecture 202 of the distributed database system, neither the application 201 nor a user that uses the application 201 needs to learn of a location at which used data is stored, reducing complexity of the application. Even if the location at which the data is stored changes, the application 201 does not need to change.

In this embodiment of the present invention, the user accesses the distributed database 203 by using the access request generated by the application 201. The access request may be an update request or may be a query request. Specifically, the access request may be in a form of structured query language (SQL). A query index field included in the access request may be a partition field or may not be a partition field. Although embodiments of the present invention are also applicable to a case in which the query index field included in the access request generated by the application 201 is a partition field, embodiments of the present invention focus on resolving a problem of how to accurately send the access request to a target database for processing if the query index field included in the access request generated by the application 201 is not a partition field.

Specifically, if the query index field included in the access request generated by the application 201 is not partition information, to avoid sending the access request to all distributed databases for processing, a partition routing table is created and stored for a data table. The partition routing table includes a mapping relationship between each non-partition information and a value of the non-partition information in the data table and each partition information (a partition field or information including a partition field) and a value of the partition information that are in the data table. That is, by querying a partition routing table of a data table, partition information and a value of the partition information of the data table that correspond to non-partition information and a value of the non-partition information, respectively, can be obtained. Optionally, multiple partition routing tables may be created for one data table. In this case, a partition routing table corresponding to a query index field is further determined according to the query index field, from the multiple partition routing tables corresponding to the data table. When the query index field included in the access request generated by a user by using the application 201 is not partition information, the user can learn of partition information and a value of the partition information that correspond to a query index field and a value of the query index field, respectively, by querying a corresponding partition routing table, and then the DDS 202 can send, according to the partition information and the value of the partition information, the access request of the user to a target database for processing.

It should be noted that, the application 201, the DDS 202, and the distributed database 203 exchange information by using a communications interface. For example, JDBC (Java database connectivity, that is, a Java API that is used to execute an SQL statement, where the Java API can provide unified access for multiple databases, and includes a group of classes and interfaces that are written by using the Java language) may be used between the application 201 and the DDS 202. Optionally, the application 201 and the DDS 202, or the DDS 202 and the distributed database 203 may connect to each other and communicate with each other by using a communications network.

A partition routing table is described in detail with reference to Table 1 and Table 2. Any data record of a data table includes multiple fields. Table 1 shows a user data table. The user data table includes 1000 data records, and each data record includes four fields: userId, msdn, name, and identifierId. In practice, the data table may include more data records and fields. In actual use, based on different considerations (for example, query efficiency, storage space, and data security), the user data table needs to be split, to be separately stored in different databases. Herein, userId is a partition field. When the query index field of the access request generated by the application 201 is userId, the DDS 202 may accurately send, according to userId and a value of userId, the access request to a target database for processing. However, in practice, usually, a user A learns of only msdn of a user B, and intends to query for identifierId of the user B. Therefore, a partition routing table tbl_route_msdn(msdn, userId) is created for a user data table. A format of the partition routing table may be shown in Table 2. The partition routing table records a mapping relationship between each the non-partition field msdn and each partition field userID such that a mapping relationship is recorded between a value of each non-partition field msdn and a value of each partition field userId. For example, when a query index field and a value of the query index field that are included in an SQL statement that is generated by the user A by using the application 201 are msdn=13800000001, according to the current system, the DDS 202 sends the SQL statement generated by the application 201 to all distributed databases (such as a DB1, a DB2, and a DB3). However, in embodiments of the present invention, the DDS 202 queries a partition routing table associated with the user data table (when multiple partition routing tables exist in the data table, a partition routing table associated with the query index field msdn needs to be further determined according to the query index field msdn), to learn that a partition field and a value of the partition field that correspond to msdn=1380000000000001 are userID=0001, so that the DDS 202 may accurately send, according to userId=0001, the SQL statement to a target database for processing.

TABLE 1

| userId | msdn | name | identifierId |
|--------|------|------|--------------|
| 0001 | 13800000001 | Jack | 00000000000001 |
| ... | ... | ... | ... |
| 1000 | 13800001000 | Jone | 00000000001000 |

TABLE 2

| userId | msdn |
|--------|------|
| 0001 | 13800000001 |
| ... | ... |
| 1000 | 13800001000 |

It should be noted that, when inserting data into a data table, a user synchronously inserts corresponding data into an associated partition routing table. For example, when a data record (userId=1001, msdn=13800001001, name=Lucy, identifierId=00000000001001) needs to be inserted into the user data table shown in Table 1, a corresponding data record (msdn=13800001001, userId=1001) is synchronously inserted into the partition routing table shown in Table 2. The user data table and the partition routing table after the data records are inserted are respectively shown in Table 3 are Table 4.

TABLE 3

| userId | msdn | name | identifierId |
|--------|------|------|--------------|
| 0001 | 13800000001 | Jack | 00000000000001 |
| ... | ... | ... | ... |
| 1000 | 13800001000 | Jone | 00000000001000 |
| 1001 | 13800001001 | Lucy | 00000000001001 |

TABLE 4

| UserId | Msdn |
|--------|------|
| 0001 | 13800000001 |
| ... | ... |
| 1000 | 13800001000 |
| 1001 | 13800001001 |

Planning of the partition routing table needs to be designed according to an actual service requirement of a user. One data table may include many fields, but there are different considerations when partition storage is performed on the data table. For example, data in the data table is evenly distributed as far as possible into different distributed databases for storage. For another example, in a scenario of primary and secondary tables, cross-database query is avoided as far as possible. Based on different considerations, different partition fields may be used. For example, in the foregoing examples, because userId is a sequentially increasing number, to evenly distribute the data in the user data table into the different distributed databases for storage, userId is used as a partition field. However, during actual use the user A may only learn of a mobile number msdn of another user B, and needs to query for other information such as a name of the user B. In this case, the partition routing table shown in Table 2 needs to be set for the user data table.

In a possible design, a partition routing table is created by a user by using the application 201, and is stored in a database. The application 201 manages the partition routing table. In this way, a user may create a partition routing table of the user according to an actual service requirement, and there is no partition routing table data that is created but is not used.

In another possible design, a partition routing table is created by an administrator of the distributed database system, and is stored in a database. In this way, when inserting data or accessing the database by using the application 201, a user does not need to consider the existence of the partition routing table, and the partition routing table is transparent for the application 201. However, the DDS 202 manages the partition routing table. Service processing of the DDS 202 is complex. Particularly, when the service processing relates to multiple partition routing tables, a processing time of the DDS 202 increases, increasing an access delay of the user. In addition, the partition routing table is created by the administrator of the distributed database system. Therefore, the creation of the partition routing table is planned based on experience of the administrator, and the partition routing table is not necessarily completely in accordance with a service requirement of the user. That is, there is partition routing table data that is created by the system administrator but is not used.

Optionally, in a case, all partition routing tables may be stored in a specific database. In this way, when needing to query a partition routing table, the DDS 202 may quickly send a query request to the specific database, improving query efficiency.

In another case, when there are many partition routing tables, to avoid excessive storage pressure, the partition routing tables may be set in multiple databases for maintenance.

In another case, alternatively, when a partition routing table is very large, the partition routing table may be split and stored into different distributed databases according to the prior art, thereby reducing storage pressure on the databases.

It should be noted that, partition information in this embodiment of the present invention includes a partition field or a partition carrying field. A mapping relationship exists between the partition carrying field and the partition field. Specifically, the partition carrying field may be generated by the partition field according to a preset rule. For example, the partition carrying field may include a character string prefix and a character string suffix. The character string prefix is the partition field, and the character string suffix is a sequential number. Alternatively, the partition carrying field may be generated by the DDS 202 according to the partition field and a partition rule The mapping relationship exists between the partition carrying field and the partition field. Therefore, a database to which an access statement needs to be sent can be determined according to the partition carrying field and the partition rule. In the following embodiment, the partition field and the partition carrying field are collectively referred to as partition information.

Figure 3:
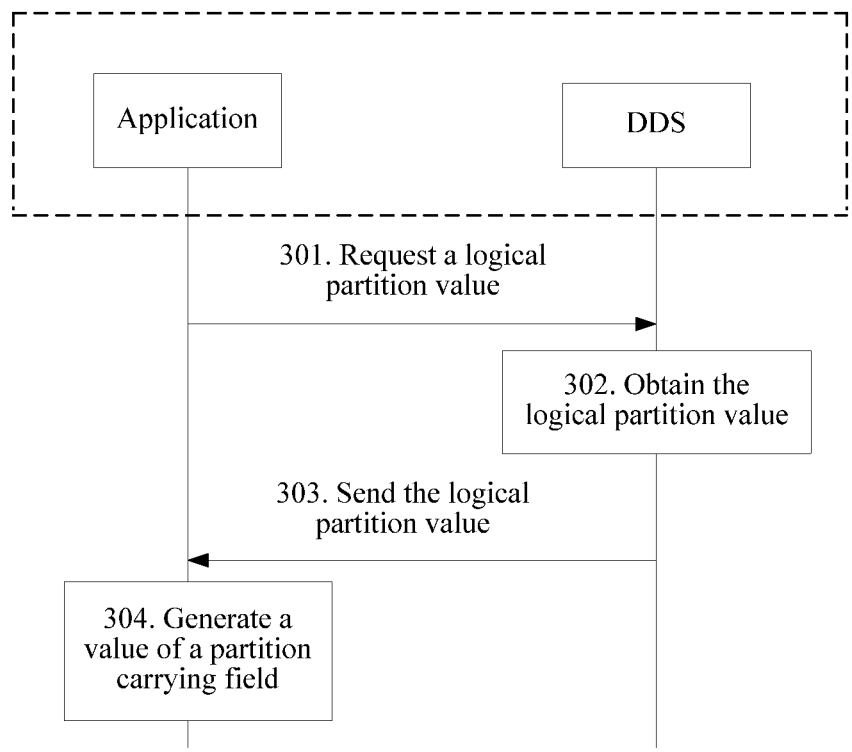
FIG. 3 is a possible method for generating a partition carrying field according to an embodiment of the present invention.

For example, FIG. 3 shows a possible method for generating a partition carrying field according to an embodiment of the present invention. Table 2 is used as an example. A value of the partition carrying field orderId may be generated from the value of the partition field userId according to the partition rule stored in the DDS 202. It is assumed that the partition rule is:

```
SHARD BY hash
    (
        INTERVAL[0, 33333] ON VP 1001 PARTITION p1,
        INTERVAL[33334, 66666] ON VP 1002 PARTITION p2
        INTERVAL[66667, 99999] ON VP 1003 PARTITION p3
    );
```

Herein, VP indicates a logical partition, and PARTITION indicates a physical partition. The partition rule calculates a partition field by using a Hash function, performing modulo an operation on 105 by using a calculation result of the Hash function, and storing data records with different modulus values in different databases. For example, a data record in a modulus value range [0, 33333] is stored by using a logical partition tool, and the logical partition corresponds to a physical partition p1. A method for generating the partition carrying field orderId include: performing a Hash calculation on the partition field userId, and then performing modulo operation on the Hash calculation result and 105, that is, Hash(userId) % 105; querying a partition rule for an operation result Hash(userId) % 105, to obtain a virtual partition value VP; and finally, obtaining a value of orderId by calculating VP*1016+sequential number. Specifically, the method includes:

Step 301: The application sends, to the DDS, a request for obtaining a logical partition value, where the request for obtaining the logical partition value includes a partition field and a value of the partition field, for example, userId=0001, where userID is the partition field and 0001 is the value of the partition field.

Step 302: The DDS receives the request that is for obtaining the logical partition value and that is sent by the application, to obtain the partition field and the value of the partition field that are in the request for obtaining the logical partition value. The DDS obtains, according to a stored partition rule, the logical partition value that corresponds to the partition field and the value of the partition field. For example, the DDS performs Hash calculation on 0001 (the value of the partition field), and then performs modulo operation on 105, that is, Hash(0001)% 105. It is assumed that an operation result is 10000. Then, the partition rule is queried, to determine that the operation result falls within a range of [0, 33333], so as to obtain the virtual partition value VP=1001.

Step 303: The DDS sends, to the application, a response for obtaining the logical partition value, where the response for obtaining the logical partition value includes the logical partition value obtained by the DDS.

Step 304: The application receives the response for obtaining the logical partition value sent by the DDS and a response for obtaining the logical partition value corresponding to the value of the partition field. The application generates a partition carrying field according to the obtained logical partition value. For example, the application obtains a value of orderId by means of calculation by using VP*1016+sequential number.

The partition carrying field generated by using the foregoing method not only includes information about the partition field, but also may include some other features such as the sequential number. Using this partition carrying field may satisfy many actual application requirements. For example, for an order number in the express mailing industry, order numbers generated by a system need to be sequentially generated (e.g., for statistical convenience), are not repetitive, and allow user to quickly find information about a corresponding parcel express according to the order number. If a partition carrying field (such as orderId) is generated by using the method provided in this embodiment of the present invention, not only a requirement of sequentially generating order numbers that are not repetitive can be satisfied, but also it is convenient for a system to directly send an SQL statement to a corresponding target database according to the partition carrying field.

Figure 1:
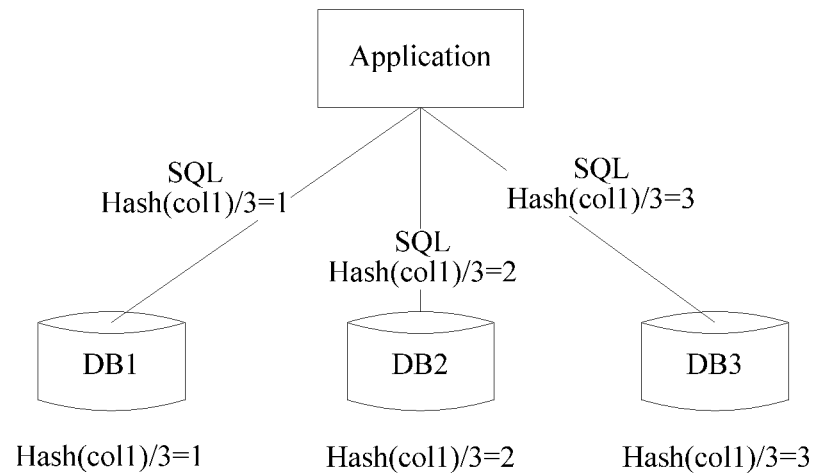
FIG. 1 is a schematic diagram of distributed database processing in the prior art.
Figure 4:
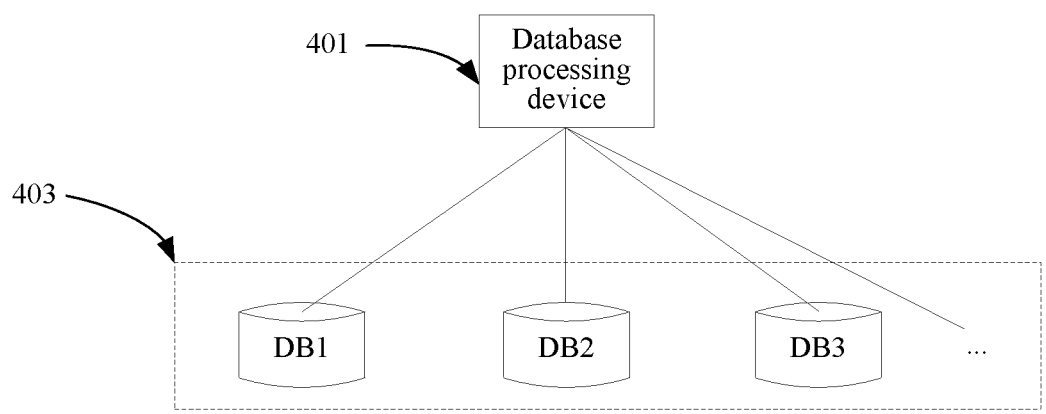
FIG. 4 is a schematic diagram of a distributed database system according to an embodiment of the present invention.

As shown in FIG. 4, the distributed database processing system provided in the present invention may include a database processing device 401 and a distributed database 403. In practice, the database processing device 401 may be the application 201 in FIG. 1, or may be the DDS 202 or be a device into which the application 201 and the DDS 202 are integrated. This is not limited in embodiments of the present invention. Optionally, when the database processing device 401 is the application 201, the system in FIG. 4 further includes the DDS. In addition, herein the "database processing device" is only a name, and the name does not constitute any limitation on the device.

Figure 5:
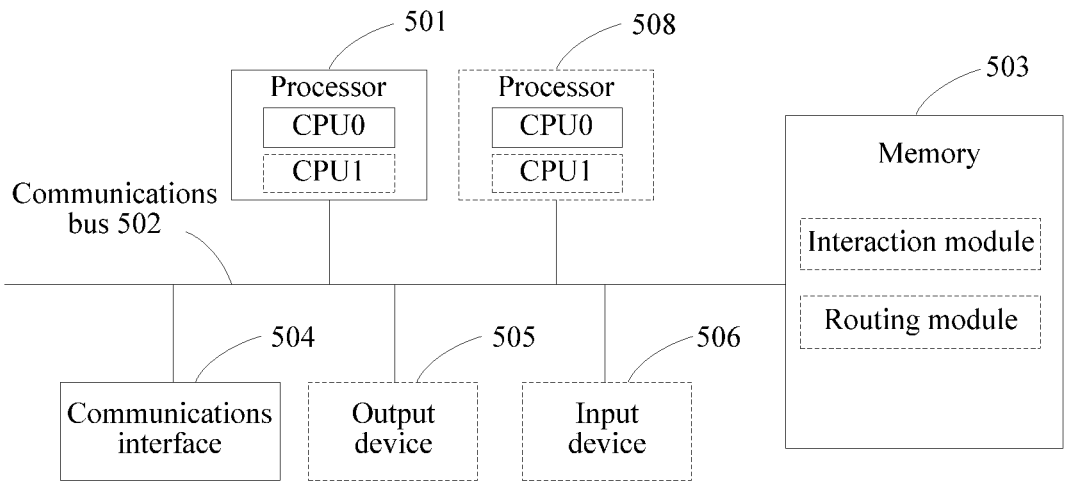
FIG. 5 is a schematic diagram of a computer device according to an embodiment of the present invention.

As shown in FIG. 5, the database processing device in FIG. 4 may be implemented in a manner of a computer device (or system) in FIG. 5.

FIG. 5 shows a schematic diagram of a computer device according to an embodiment of the present invention. The computer device 500 includes at least one processor 501, a communications bus 502, a memory 503, and at least one communications interface 504.

The processor 501 may be a general-purpose central processing unit (CPU), a micro-processor, an application-specific integrated circuit (ASIC), or one or more integrated circuits configured to control execution of a program of a solution of the present invention.

The communications bus 502 may include a path for transmitting information between the foregoing components. The communications interface 504 uses any transceiver-type apparatus to communicate with another device or a communications network such as the Ethernet, a radio access network (RAN), or a wireless local area network (WLAN).

The memory 503 may be a read-only memory (ROM) or another type of static storage device that can store static information and a static instruction, or a random access memory (RAM) or another type of dynamic storage device that can store information and an instruction, or may be an electrically erasable programmable read-only memory (EEPROM), a compact disc read-only memory (CD-ROM) or another compact disc storage medium, optical disc storage medium (including a compact disc, a laser disc, an optical disc, a digital versatile disc, a Blu-ray disc, and the like), a magnetic disk storage medium or another magnetic storage device, or any other medium that can be configured to carry or store desired program code in the form of an instruction or a data structure and that is accessible to a computer, but is not limited thereto. The memory may independently exist, and connect to the processor by using the bus. Alternatively, the memory and the processor may be integrated.

The memory 503 is configured to store program code for executing a solution of the present invention. The execution is controlled by the processor 501. The processor 501 is configured to execute the program code stored in the memory 503.

In specific implementation, in an embodiment, the processor 501 may include one or more CPUs, for example, a CPU0 and a CPU1 in FIG. 5.

In a specific implementation of an embodiment, the computer device 500 may include multiple processors such as the processor 501 and the processor 508 in FIG. 5. Each of these processors may be a single-core CPU processor, or may be a multi-core CPU processor. Herein, the processor may refer to one or more devices, circuits, and/or processing cores used to process data (such as a computer program instruction).

In a specific implementation of an embodiment, the computer device 500 may further include an output device 505 and an input device 506. The output device 505 communicates with the processor 501, and can display information in multiple manners. For example, the output device 505 may be a liquid crystal display (LCD), a light emitting diode (LED) display device, a cathode ray tube (CRT) display device, a projector, or the like. The input device 506 communicates with the processor 501, and can accept input of a user in multiple manners. For example, the input device 506 may be a mouse, a keyboard, a touchscreen device, a sensor device, or the like.

The computer device 500 may be a general computer device or a dedicated computer device. In specific implementation, the computer device 500 may be a desktop computer, a portable computer, a network server, a personal digital assistant (PDA), a mobile phone, a tablet computer, a wireless terminal device, a communications device, an embedded device, or a device that has a structure similar to that in FIG. 5. This embodiment of the present invention does not limit a type of the computer device 500.

The database processing device in FIG. 4 may be the device shown in FIG. 5. A memory of the database processing device stores one or more software modules (such as an interaction module and a routing module). The database processing device may implement a software module by using a processor and program code in the memory, and send an access request to a target database for processing.

Based on the system architectural diagram shown in FIG. 2, to more clearly describe a processing process of the distributed database system, this embodiment of the present invention provides a schematic flowchart of a distributed database processing method. Specifically, according to functional division of the application 201 and the DDS 202, two implementations in FIG. 6 and FIG. 7 may be included. In the embodiment in FIG. 6, an example in which the database processing device is the DDS or a device into which the application and the DDS are integrated is used. In the embodiment in FIG. 7, an example in which the database processing device is the application or a device into which the application and the DDS are integrated is used. It should be noted that this embodiment of the present invention does not limit a running form of the DDS 202. When the DDS 202 is in an embedded running form, message exchange between the application 201 and the DDS 202 is internal exchange. When the DDS 202 is in an independent process running form, message exchange between the application 201 and the DDS 202 is external exchange.

Figure 6:
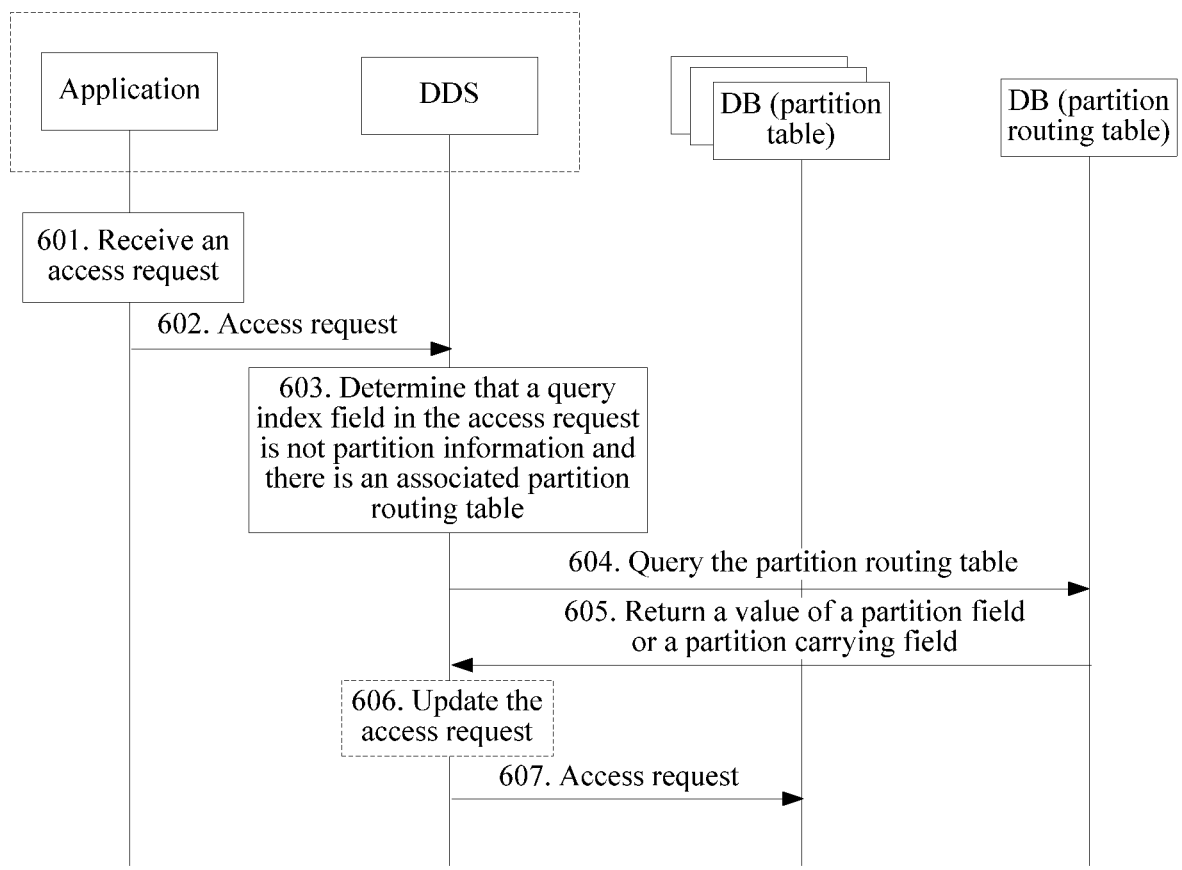
FIG. 6 is a schematic flowchart of a distributed database processing method according to an embodiment of the present invention.

FIG. 6 shows a schematic flowchart of a distributed database processing method according to an embodiment of the present invention. The method includes the following steps.

In Step 601 and Step 602, an application 201 receives an access request of a user and sends the access request to a DDS.

Specifically, the application 201 receives the access request entered by the user. The access request includes a to-be-accessed target field, search criteria, and a name of a to-be-accessed data table. The search criteria include a query index field and a value of the query index field. The access request may be a query request or an update request. For example, the user needs to query the user data table A in Table 3 for a user name corresponding to a mobile number 13800000001, and then the access request sent by the application 201 to the DDS 202 may be: select name from A, where msdn='13800000001', where name indicates the to-be-accessed target field is the name, msdn='13800000001' indicates the search criteria, and A indicates a name of the to-be-accessed data table.

In Step 603, the DDS 202 receives the access request sent by the application 201, parses the access request, determines that a query index field in the access request is not partition information of the data table, and determines that there is a partition routing table associated with the data table.

In specific implementation, after receiving the access request, the DDS parses the access request, to obtain the query index field and the value of the query index field that are in the access request, and determines that the query index field is not the partition information of the data table. The DDS stores metadata of a partition routing table of the data table. The metadata of the partition routing table is used to indicate that there is a partition routing table associated with the data table. When determining that the query index field is not the partition information of the data table, the DDS may determine, according to the metadata of the partition routing table, that there is a partition routing table associated with the data table. Optionally, when there are multiple partition routing tables associated with the data table, the method further includes: determining, according to a query index field in an access request, a partition routing table corresponding to the query index field in the access request.

In Step 604, the DDS sends a query request to a database that stores the partition routing table, where t. The query request includes the query index field and a value of the query index field.

A possible implementation is that the DDS generates a query request. The query request includes a to-be-accessed target field, search criteria, and a name of a to-be-accessed data table. The to-be-accessed target field is the partition information of the data table and that is stored in the partition routing table. The search criteria include the query index field and the value of the query index field, and the name of the to-be-accessed data table is a name of the partition routing table. For example, for the access request in step 601, the query request generated by the DDS may be: select userId from tbl_route_msdn, where msdn='13800000001', where userId indicates the to-be-accessed target field, msdn='13800000001' indicates the search criteria, and tbl_route_msdn indicates the associated partition routing table.

It should be noted that, when the partition routing table is stored in multiple databases, the DDS needs to separately send a query request to the multiple databases.

In Step 605, a distributed database receives the query request sent by the DDS, obtains, from the partition routing table of the data table, partition information and a value of the partition information that correspond to the query index field and the value of the query index field, uses the obtained partition information and value of the partition information as a query result, and returns the query result to the DDS.

In Step 606, the DDS receives the query result returned by the distributed database, generates an updated access request according to the partition information and the value of the partition information that correspond to the query index field and that are in the query result, where the updated access request includes the partition information and the value of the partition information that correspond to the query index field, and a to-be-accessed target field. The DDS further determines, according to the partition information and the value of the partition information that correspond to the query index field, a target database corresponding to the updated access request.

It should be noted that, it is not necessary for the DDS to generate the updated access request according to the partition information and the value of the partition information that correspond to the query index field and that are in the query result. In a possible implementation, with reference to a partition rule corresponding to the to-be-accessed data table, the DDS directly determines, according to the partition information and the value of the partition information that correspond to the query index field and that are in the query result, the target database corresponding to the access request in step 601.

Specifically, when obtaining, from the corresponding partition routing table, the partition information and the value of the partition information that correspond to the query index field, the DDS can determine, with reference to the partition rule of the to-be-accessed data table, a specific distributed database to which the access request received from the application is sent.

In Step 607, the DDS sends the access request to a corresponding distributed database for processing.

Optionally, the method further includes: receiving, by the DDS, an access result, and feeding back the access result to the application, where the access result includes a data record corresponding to the to-be-accessed target field in the access request in step 601.

In this embodiment of the present invention, after receiving an access request of a user, an application sends the access request to a DDS. The DDS determines that a query index field in the access request is not partition information, and obtains, according to an associated partition routing table, partition information and a value of the partition information that correspond to the query index field and a value of the query index field that are in the access request. Then, the DDS determines, according to the obtained partition information and value of the partition information, to send the access request to a target distributed database. A problem that the access request needs to be sent to all databases for processing in the prior art is avoided, effectively reducing a delay of an access response, and also reducing system performance consumption. In addition, an entire process is transparent to the application, and the application can quickly obtain an access result as long as the access request is generated, effectively improving use experience of the user.

The foregoing actions of the DDS may be performed by the DDS according to a software module in the memory mentioned in the embodiment in FIG. 5. For example, Step 603 may be performed according to the interaction module in FIG. 5. Step 604, Step 606, and Step 607 may be performed according to the routing module in FIG. 5.

Figure 7:
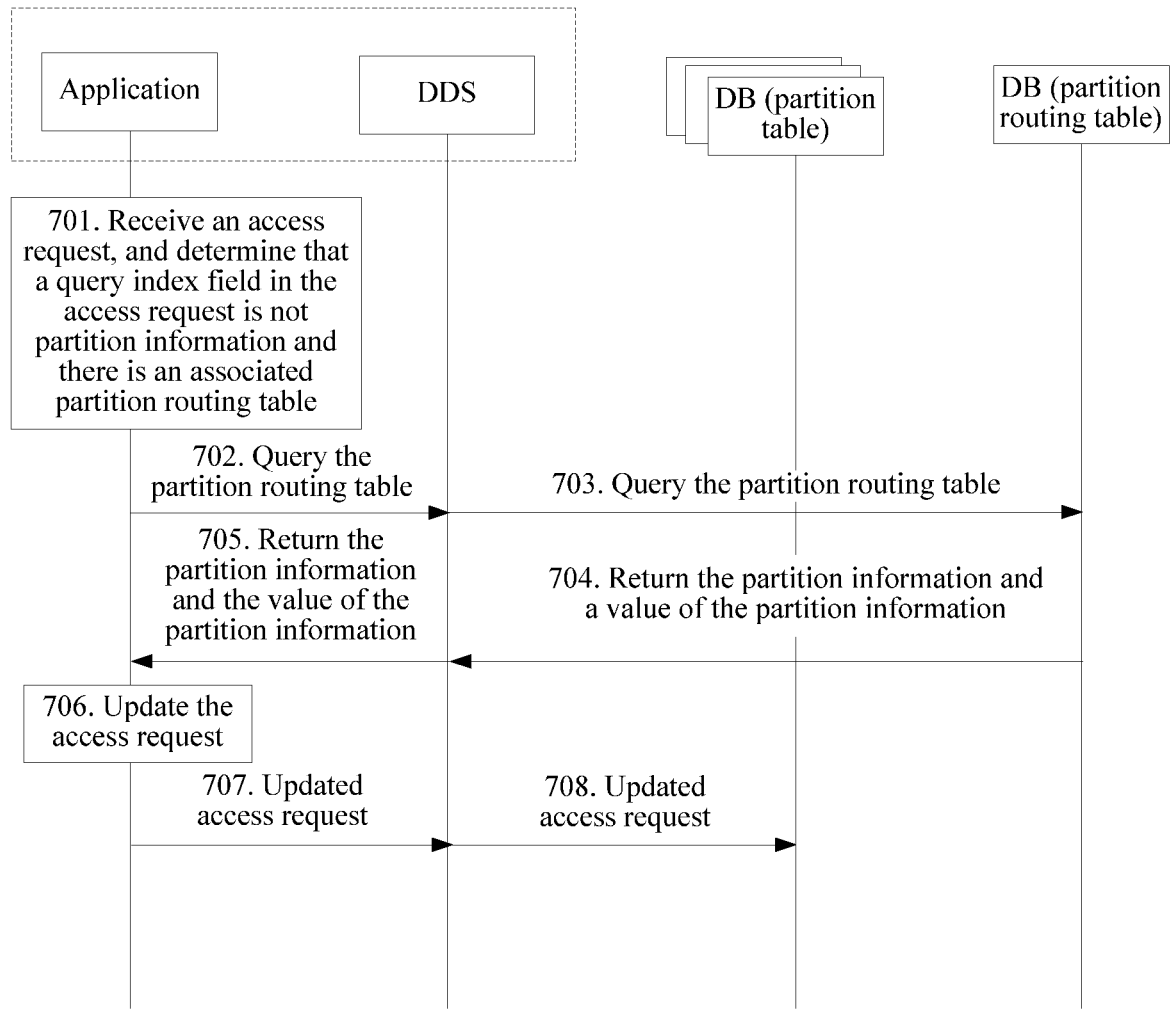
FIG. 7 is a schematic flowchart of another distributed database processing method according to an embodiment of the present invention.

FIG. 7 shows a schematic flowchart of another distributed database processing method according to an embodiment of the present invention. The method includes the following steps.

In Step 701, an application 201 receives an access request of a user, where the access request includes a query index field, a value of the query index field, and a to-be-accessed target field; and determines that the query index field in the access request is not partition information of a data table, and there is a partition routing table associated with the data table.

In a specific implementation, after receiving the access request entered by the user, the application obtains the query index field and the value of the query index field that are in the access request, and determines that the query index field is not the partition information of the data table. The application stores metadata of a partition routing table of the data table. The metadata of the partition routing table is used to indicate that there is a partition routing table associated with the data table. When determining that the query index field is not the partition information of the data table, the application may determine, according to the metadata of the partition routing table, that there is a partition routing table associated with the data table. Optionally, when there are multiple partition routing tables associated with the data table, the method further includes: determining, according to a query index field in an access request, a partition routing table corresponding to the query index field in the access request.

In step 702, the application 201 sends, to a DDS 202, a query request for querying the partition routing table, where the query request for querying the partition routing table includes the query index field and the value of the query index field in step 701.

As mentioned in the foregoing embodiment, the application 201 transparently performs operation on a distributed database such as a DB1, a DB2, or a DB3 by using the DDS 202. All operations performed on a database by the application 201 are processed by the DDS 202, and are determined to be sent to a specific distributed database for processing.

A possible implementation is that the application generates a query request, where the query request includes a to-be-accessed target field, search criteria, and a name of a to-be-accessed data table. The to-be-accessed target field is the partition information that is of the data table and that is stored in the partition routing table, the search criteria include the query index field and the value of the query index field, and the name of the to-be-accessed data table is a name of the partition routing table determined in step 701. For example, the query request generated by the application may be: select userId from tbl_route_msdn, where msdn='13800000001', where userId indicates the to-be-accessed target field, msdn='13800000001' indicates the search criteria, and tbl_route_msdn indicates the associated partition routing table. In Step 703, the DDS 202 receives the query request that is for querying the partition routing table and that is sent by the application 201, and sends, to a distributed database that stores the partition routing table, the query request for querying the partition routing table. In Step 704, the distributed database that stores the partition routing table receives the query request that is for querying the partition routing table and that is sent by the DDS 202, obtains partition information and a value of the partition information that correspond to the query index field and the value of the query index field, uses the obtained partition information and value of the partition information as a query result, and sends the query result to the DDS 202.

In step 705, the DDS 202 receives the query result returned by the distributed database that stores the partition routing table, and sends the received query result to the application 201.

In Step 706, the application 201 receives the query result returned by the DDS 202, and updates the access request by using the partition information and the value of the partition information that are in the received query result.

Specifically, the updated access request includes the partition information, the value of the partition information, and the to-be-accessed target field.

In Step 707, the application 201 sends the updated access request to the DDS 202.

In Step 708, the DDS 202 receives the updated access request sent by the application 201, parses the updated access request, to obtain the partition information and the value of the partition information, and sends the updated access request to a target database according to the partition information and the value of the partition information.

In this embodiment of the present invention, after receiving an access request of a user, an application determines that a query index field in the access request is not partition information, obtains, according to an associated partition routing table, partition information and a value of the partition information that correspond to the query index field and a value of the query index field that are in the access request, then updates the access request by using the obtained partition information and value of the partition information, and sends the updated access request to a DDS. The DDS determines, according to the partition information and the value of the partition information, to send the updated access request to a target distributed database. Metadata of the partition routing table is stored in the application, and therefore the application can determine the existence of the partition routing table. In this case, a partition routing table of a data table is closely coupled to the application, and the DDS does not need to improve and needs only to process, according to the current systems, an SQL statement generated by the application. Especially when multiple applications share one DDS, load on the DDS is effectively reduced. For a user, the access result can be quickly obtained as long as the access request is generated, effectively improving use experience of the user.

The foregoing actions of the application may be performed by the application according to a software module in the memory mentioned in the embodiment in FIG. 5. For example, Step 701 may be performed according to the interaction module in FIG. 5. Step 702, Step 706, and Step 707 may be performed according to the routing module in FIG. 5.

To more clearly describe a processing process of a distributed database system, a processing process of the distributed database system in a scenario of primary and secondary tables is now described by using an example. In this embodiment of the present invention, it is assumed that storage and query of primary and secondary tables need to be processed. The primary table is a user table: tbl_user (userId, msdn, name), and the secondary table is a user order table tbl_user_order(userId, orderId, orderNo, detail). The primary table and the secondary table are respectively shown in Table 5 and Table 6. Cross-database query reduces management and query performance of data. Therefore, as desired by the management and query performance, information and related data that are of a same user are stored in a same sub-database. That is, sub-database storage can be performed according to users. In this way, when data of a user is queried for, the query can be performed in only one sub-database, avoiding cross-database query. Specifically, both the user table tbl_user and the user order table tbl_user_order use userId as a partition field. Therefore, when a same partition rule is used, data records of a user table tbl_user and a user order table tbl_user_order of a same user are stored in a same database. It should be noted that, in this embodiment of the present invention, orderId in the user order table tbl_user_order is a partition carrying field, and a value of orderId may be generated by the system according to a particular rule and the partition field userId, for example, may be generated by using the method in the embodiment in FIG. 3. To clearly describe a process of storage and query, in this embodiment of the present invention, it is assumed that a data record that needs to be stored into the user table tbl_user is (userId=0001, msdn=1380000000, name=Jack), and a data record that needs to be stored into the user order table tbl_user_order is (userId=0001, orderId=1001000000000001, orderNo=00000001, detail=iphone6s), where orderId=1001000000000001 is determined according to a generation rule of orderId.

TABLE 5

User table tbl_user(userId, msdn, name)

| Field name | Field meaning |
| --- | --- |
| userId | Unique identifier of a user |
| msdn | Mobile number of a user |
| name | User name |

TABLE 6

User order table tbl_user_order(userId, orderId, orderNo, detail)

| Field name | Field meaning |
| --- | --- |
| userId | Unique identifier of a user |
| orderId | Unique identifier of an order |
| orderNo | Order number (including date information, and order code on a day) |
| detail | Order details |

Figure 8:
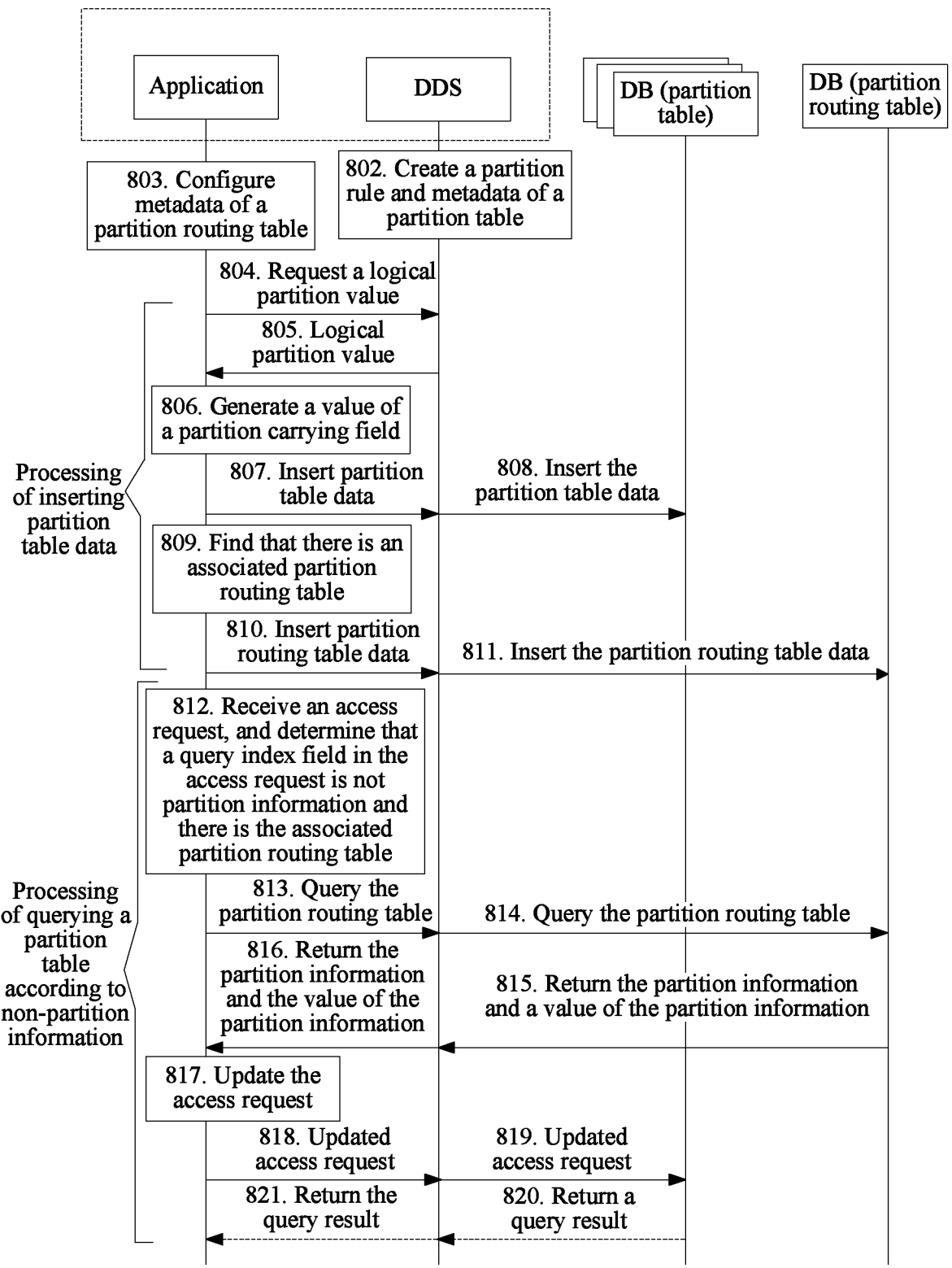
FIG. 8 is a schematic flowchart of another distributed database processing method according to an embodiment of the present invention.

FIG. 8 shows a distributed database processing method. The method includes the following steps.

Before a data table is stored into a distributed database, the following setting needs to be performed first:

Step 801: Plan and create a partition routing table.

In this embodiment of the present invention, a partition field of a user table tbl_user is userId, but a user often uses msdn to query for user information. Therefore, the user needs to set a partition routing table tbl_route_msdn(msdn, userId) for the user table tbl_user. Herein, msdn is a query index field, and userId is a partition field included in the partition routing table. Similarly, the user often uses orderNo to query for an order number, and needs to set a partition routing table tbl_route_order(orderNo, orderId) for a user order table tbl_user_order. Herein, orderNo is a query index field, and orderId is a partition carrying field. Specific forms of the partition routing table tbl_route_msdn(msdn, userId) and the tbl_route_order(orderNo, orderId) are respectively shown in Table 7 and Table 8.

TABLE 7

Partition routing table tbl_route_msdn(msdn, userId)

| Field name | Field meaning |
| --- | --- |
| msdn | Mobile number of a user |
| userId | Unique identifier of a user |

TABLE 8

Partition routing table tbl_route_order(orderNo, orderId)

| Field name | Field meaning |
| --- | --- |
| orderNo | Order number (including date information, and order code on a day) |
| orderId | Unique identifier of an order |

It should be noted that there are usually few fields in the partition routing table, and therefore a data volume is relatively small, and the partition routing table may be usually stored by using a fixed database. Even if the data volume of the partition routing table is very large, the partition routing table may be stored into multiple databases in a distributed manner. For ease of description, in this embodiment of the present invention, all partition routing tables are stored in a fixed database, for example, the DB3 in the system diagram in FIG. 1.

Step 802: Create, on a DDS, a partition rule and metadata of a partition table.

Specifically, the created partition rule may be:

```
CREATE SHARDRULE rule1
SHARD BY hash
(
    INTERVAL[0, 33333] ON VP 1001 PARTITION p1,
    INTERVAL[33334, 66666] ON VP 1002 PARTITION p2
    INTERVAL[66667, 99999] ON VP 1003 PARTITION p3
);
```

For specific meaning of the foregoing partition rule, refer to the related description in the embodiment in FIG. 3. Details are not described herein again.

The created metadata of the partition table may be:

```
ALTER TABLE tbl_user SHARDING BY(userId)
USING SHARDRULE rule1;
ALTER TABLE tbl_user_order SHARDING BY(userId)
WITH VP(DIV(orderId, 1016))
USING SHARDRULE rule1;
```

Creating the metadata of the partition table includes creating a partition table tbl_user using userId as the partition field and using a partition rule rule1 to partition a data table tbl_user. Creating the metadata of the partition table further includes a partition table tbl_user_order using userId as the partition field or determining a VP value by using DIV(orderId, 1016), and using the partition rule rule1 to partition a data table tbl_user_order.

Step 803: Configure, on an application, metadata of the partition routing table.

The user configures, on an application program, the metadata of the partition routing table for the data table. The metadata of the partition routing table is data for describing the partition routing table. A partition routing table associated with the data table may be determined according to the metadata of the partition routing table. Specifically, a mark is configured on the application, to record that the data table tbl_user includes the partition routing table tbl_route_msdn (msdn, userId), and the data table tbl_user_order includes the partition routing table tbl_route_order(orderNo, orderId), so as to insert a corresponding partition routing table record when a partition table data record is inserted, and perform partition routing table matching when a partition table data record is queried.

It should be noted that, in this embodiment of the present invention, the partition routing table is created by the user according to a specific service requirement, so as to avoid a case in which there is a large volume of partition routing table data that has been created but is not used.

After the foregoing setting is completed, the data record in the data table may be stored into a distributed database. Specifically:

Step 804 to step 806: The application requests, from the DDS, a logical partition value corresponding to a partition field, and the DDS obtains the corresponding logical partition value, and returns the logical partition value to the application program.

Specifically, step 804 to step 806 are respectively the same as steps 301, 302, and 304 in the embodiment in FIG. 3. Details are not described herein again.

In this embodiment of the present invention, the user order table tbl_user_order includes the partition field userId and the partition carrying field orderId. When data is inserted into the user order table tbl_user_order, a system needs to first calculate a value of orderId. For example, data userId to be inserted into the user order table tbl_user_order is 0001. The DDS finds that a logical partition value corresponding to userId=0001 is 1001. Therefore, it can be learned according to the foregoing orderId generation rule that a value of orderId is 1001000000000000 (that is, 10000*1016+1).

Steps 807 and 808: The application inserts partition table data by using the DDS.

In this embodiment of the present invention, a data record (userId=0001, msdn=1380000000, name=Jack) needs to be inserted into the partition table of the user table tbl_user, and a data record (userId=0001, orderId=1001000000000001, orderNo=00000001, detail=iphone6s) needs to be inserted into the partition table of the user order table tbl_user_order. Herein, orderId=1001000000000001 is determined according to step 806. Inserting a data record into a specified distributed database according to a partition rule and a partition field is a technology well known by a person skilled in the art. Details are not described herein again. The partition tables tbl_user and tbl_user_order into which data has been inserted are respectively shown in Table 9 and Table to.

TABLE 9

Partition table tbl_user into which data has been inserted

| userId | msdn | name |
|--------|------|------|
| 0001 | 1380000000 | Jack |

TABLE 10

Partition table tbl_user_order into which data has been inserted

| userId | orderId | orderNo | detail |
|--------|---------|---------|--------|
| 0001 | 1001000000000001 | 00000001 | iphone6s |

Step 809 to step 811: When inserting the partition table data by using the DDS, the application checks whether configuration of an associated partition routing table exists, and if the configuration exists, generates and inserts corresponding partition routing table data.

In this embodiment of the present invention, when inserting the data (userId=0001, msdn=1380000000, name=Jack) into the data table tbl_user(userId, msdn, name), the user determines, according to the metadata that is of the partition routing table and that is configured on the application, that the partition routing table tbl_route_msdn(msdn, userId) is associated with the data table tbl_user(userId, msdn, name), and then the user inserts corresponding partition routing table data (msdn=1380000000, userId=0001) into the associated partition routing table tbl_route_msdn(msdn, userId).

When inserting data (userId=0001, orderId=1001000000000001, orderNo=00000001, detail=iphone6s) into the user order table tbl_user_order, the user determines, according to the metadata that is of the partition routing table and that is configured on the application, that the partition routing table tbl_route_order(orderNo, orderId) is associated with the user order table tbl_user_order, and then the user inserts corresponding partition routing table data (orderNo=00000001, orderId=1001000000000001) into the associated partition routing table tbl_route_order(orderNo, orderId). Similarly, inserting corresponding partition routing table data into an associated partition routing table is also a technology well known by the person skilled in the art. Details are not described in this embodiment of the present invention again. The partition routing tables tbl_route_msdn and tbl_route_order into which partition routing table data has been inserted are respectively shown in Table 11 and Table 12.

TABLE 11

Partition routing table tbl_route_msdn into which data has been inserted

| msdn | userId |
|------|--------|
| 1380000000 | 0001 |

TABLE 12

Partition routing table tbl_route_order into which data has been inserted

| orderNo | orderId |
|---------|---------|
| 00000001 | 1001000000000001 |

In this embodiment of the present invention, step 804 to step 811 are performed, so that a data record can be stored into a corresponding database. Different from the prior art, in this embodiment of the present invention, when a data record is stored, corresponding partition routing table data needs to be generated, and the generated partition routing table data needs to be inserted into an associated partition routing table. Subsequently, when the application queries for data, if a used query index field is neither a partition field nor a partition carrying field, the DDS may obtain, according to the associated partition routing table, a value of the partition field or the partition carrying field corresponding to a value of the query index field, and feed back the obtained value to the application, so that the application performs data query according to a value of a partition field or a partition carrying field that is corresponding to the value of the query field, so as to improve data query efficiency.

It should be noted that, when the stored data record does not relate to the partition carrying field, step 804 to step 806 are not necessary.

Step 812: The application receives a query request entered by a user, where the query request includes a query index field, a value of the query index field, and a to-be-accessed target field; and if determining that the query index field is neither a non-partition field nor a partition carrying field, determines, according to the configured metadata of the partition routing table, whether there is the associated partition routing table.

Specifically, when the query field in the query request generated by the user by using the application is neither a partition field nor a partition carrying field, the application determines, according to the metadata that is of the partition routing table and that is configured in step 803, whether there is the associated partition routing table. For example, when the query request (in a form of an SQL statement) generated by the application is: select name from tbl_usr, where msdn='13800000001', the application determines that the query field msdn is neither a partition field nor a partition carrying field. In this case, the application determines, according to the metadata of the partition routing table and configured in step 803, whether the partition routing table tbl_route_msdn is associated with the user table tbl_usr. When the query request generated by the application is: select detail from tbl_user_order, where orderNo='00000001', the application determines that the query field orderNo is neither a partition field nor a partition carrying field. In this case, the application determines, according to the metadata that is of the partition routing table and that is configured in step 803, that the partition routing table tbl_route_order exists for the user order table tbl_user_order.

Step 812 to step 819 are the same as steps 701 to 708 in the embodiment in FIG. 7. Details are not described herein again.

Specifically, the application generates an SQL query statement to obtain, from a distributed database storing an associated partition routing table, partition information and a value of the partition information that correspond to a value of the query field. For example, in this embodiment of the present invention, the application program queries the partition routing table tbl_route_msdn associated with the user table tbl_usr for a value of userId corresponding to msdn=13800000001. Specifically, the generated SQL statement may be: select userId from tbl_route_msdn, where msdn='13800000001'. The application program queries the partition routing table tbl_route_order associated with the user order table tbl_user_order for a value of orderId corresponding to orderNo=00000001. Specifically, the generated SQL statement may be: select orderId from tbl_route_order, where 'orderNo=0000001'.

The application modifies, according to the obtained partition information and value of the partition information, a query statement initially generated by the user by using the application, and replaces, with the obtained partition information and value of the partition information, a query index field and a value of the query index field that are in the initially generated query statement. For example, in this embodiment of the present invention, the value of userId corresponding to msdn=13800000001 and is obtained by querying in the partition routing table tbl_route_msdn, is 0001, and therefore, the application program modifies an initially generated SQL statement used to query the user table tbl_usr to: select name from tbl_usr, where userId='00000001'. The value of orderId corresponding to orderNo=00000001 and is obtained by querying in the partition routing table tbl_route_order is 1001000000000001, and therefore, the application program modifies an initially generated SQL statement used to query the user order table tbl_user_order to: select detail from tbl_user_order, where orderId='1001000000000001'.

It should be noted that, when the query field in the query request used by the user to query for partition table data in step 812 is a partition carrying field, the application forwards the query request to the DDS. The DDS parses the query request, and obtains a corresponding partition field or logical partition according to the partition carrying field. The DDS may further directly determine, according to the partition rule, a sub-database in which a data record is located, and send the query request to the determined database for processing. For example, when the user queries the user order table for the data record detail by using orderId, the SQL query statement may be: select detail from tbl_user_order, where 'orderId=1001000000000001'. The DDS determines corresponding VP=1001 according to orderId, and can learn, with reference to a partition rule rule1, that a physical partition corresponding to VP=1001 is p1, so as to send the SQL statement to p1 for processing.

Step 820 and step 821: After processing the updated access request, the target database sends a query result to the application program by using the DDS.

According to the solution provided in this embodiment of the present invention, an associated partition routing table is set for a data table. Therefore, when a query field in a query request is not partition information, a value of partition information corresponding to a value of the query field may be determined according to the partition routing table corresponding to the data table. Then, the query request may be sent, according to the partition information, the value of the partition information, and a partition rule of the data table, to a corresponding database for processing. A problem that the query request needs to be sent to all databases for processing in the prior art is avoided, effectively reducing a delay of a query response, and also reducing system performance consumption. It should be noted that, in this embodiment of the present invention, metadata of the partition routing table is stored in an application, and therefore the application completely senses the partition routing table. In this case, the partition routing table of the data table is closely coupled to the application, and the DDS does not need to improve and needs only to process, according to the prior art, an SQL statement generated by the application. Especially when multiple applications share one DDS, load on the DDS is effectively reduced. In addition, the partition routing table of the data table is created by the user according to an actual requirement of a service, so as to effectively avoid that a partition routing table that is created but is not used is stored.

Figure 9:
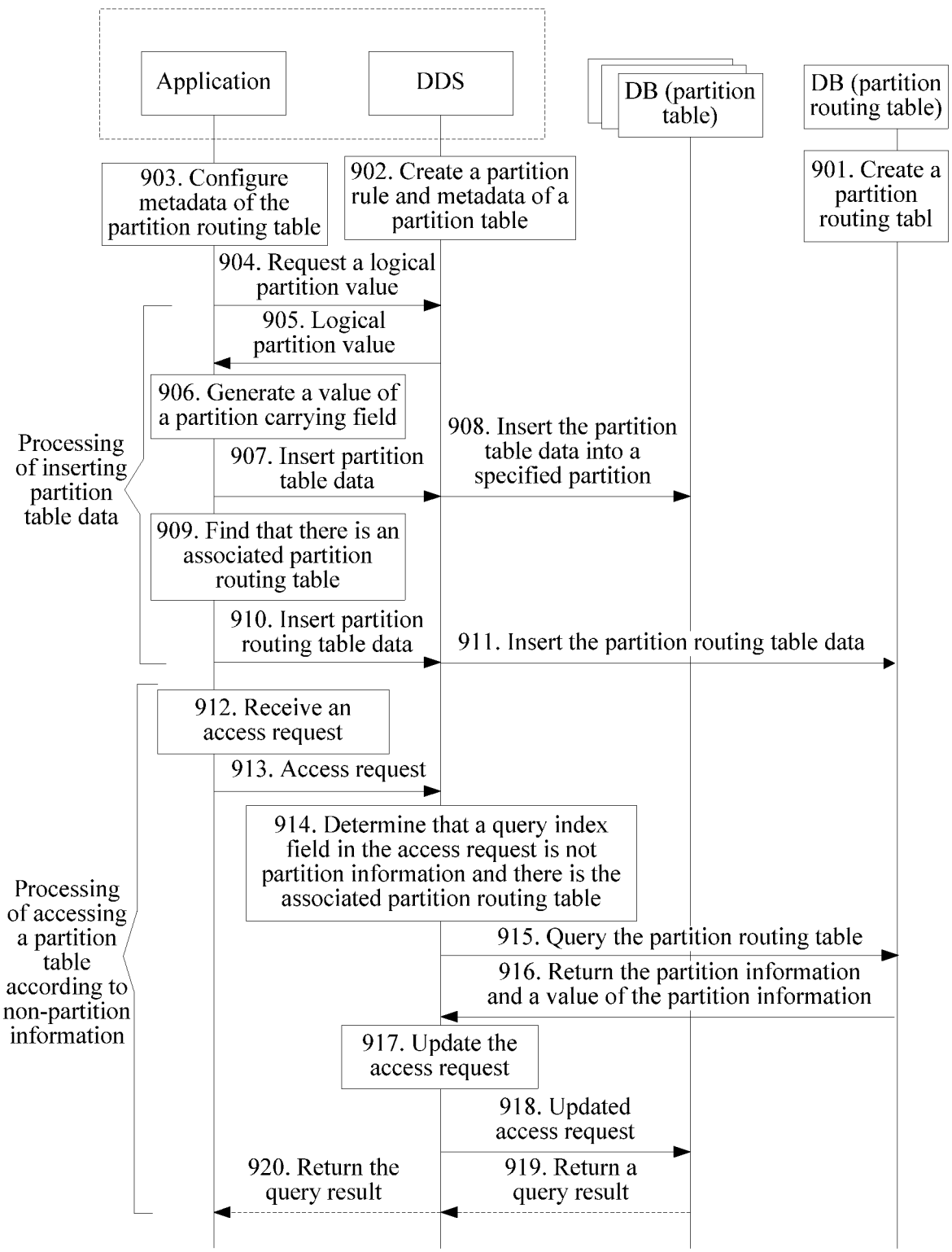
FIG. 9 is a schematic flowchart of another distributed database processing method according to an embodiment of the present invention.

FIG. 9 shows another distributed database processing method. The method includes the following steps.

Step 901: Plan and create a partition routing table.

Specifically, step 901 is the same as step 801 in the embodiment in FIG. 8. For details, refer to the related description in step 801.

Step 902: Create, on a DDS, a partition rule and metadata of a partition table.

Specifically, the created partition rule may be:

---

CREATE SHARDRULE rule1
SHARD BY hash
(
    INTERVAL[0, 33333] ON VP 1001 PARTITION p1,
    INTERVAL[33334, 66666] ON VP 1002 PARTITION p2
    INTERVAL[66667, 99999] ON VP 1003 PARTITION p3
);
PARTITION REFERENCE prsql1 "select userId from tbl_route_msdn where msdn=:msdn" AS COLUMN
PARTITION REFERENCE prsql2 "select DIV(orderId, $10^{16}$) from tbl_route_order where orderId=:orderId" AS COLUMN

---

Compared with step 802 in the embodiment in FIG. 8, the same part is not described again, and a difference is that PARTITION REFERENCE (the part in bold) is added. This indicates that when a query field in a query request is not partition information, a defined SQL statement may be used to query a corresponding partition routing table, to obtain a partition value or a VP value corresponding to the partition information.

The created metadata of the partition table may be:

```
ALTER TABLE tbl_user SHARDING BY(userId)
PARTITION REFERENCE prsql1 COLUMNS(msdn)
USING SHARDRULE rule1;
ALTER TABLE tbl_user_order SHARDING BY(userId)
WITH VP(DIV(orderId, 10^16))
PARTITION REFERENCE prsql2 COLUMNS(orderNo)
USING SHARDRULE rule1;
```

Compared with step 802 in the embodiment in FIG. 8, the same part is not described again, and a difference is that PARTITION REFERENCE prsql1 COLUMNS(msdn) and PARTITION REFERENCE prsql2 COLUMNS(orderNo) (parts in bold) are added. Herein, PARTITION REFERENCE prsql1 COLUMNS(msdn) indicates that when a query field in a query request is not partition information but is a field msdn, the field msdn may be used as a parameter to determine, by using PARTITION REFERENCE prsql1, a database for processing to which the query request is sent. Herein, PARTITION REFERENCE prsql2 COLUMNS(orderNo) indicates that when a query field in a query request is not partition information but is a field orderNo, the field orderNo may be used as a parameter to determine, by using PARTITION REFERENCE prsql2, a database for processing to which the query request is sent.

Step 903 to step 911 are the same as step 803 to step 811 in the embodiment in FIG. 8. For details, refer to the related description in step 803 to step 811.

Step 912 to step 918 are the same as step 601 to step 607 in the embodiment in FIG. 6. For related content, refer to the embodiment in FIG. 6.

Specifically, in step 914, the DDS determines that the query index field in the query request is neither a non-partition field nor a partition carrying field, and determines that a field matching the query index field exists in PARTITION REFERENCE defined in the created metadata of the partition table; and generates, according to the query index field and a corresponding SQL statement in the partition rule, an SQL statement for querying the partition routing table. For example, an SQL statement received by the DDS from the application is: select name from tbl_usr, where msdn='13800000001', and the DDS determines that the query field msdn is neither a partition field nor a partition carrying field, but can learn, from the metadata that is of the partition table and that is created in step 902, that defined PARTITION REFERENCE prsql1 COLUMNS(msdn) exists. Therefore, the field msdn may be used as a parameter to determine, by using PARTITION REFERENCE prsql1, a database for processing to which the query request is sent. Specifically, the DDS generates, according to prsql1 in the partition rule, the SQL statement for querying the partition routing table: select userId from tbl_route_msdn where msdn='1380000000000001'.

Step 919 and step 920: After processing the updated access request, the target database sends a query result to the application by using the DDS.

A difference between this embodiment of the present invention and the embodiment in FIG. 8 is that, although metadata of a partition routing table is stored in an application, the application partially determines the partition routing table, that is, when a partition table data record needs to be inserted, the application determines, according to the metadata of the partition routing table, to insert corresponding partition routing table data. In this way, consistency between a data table and a corresponding partition routing table can be effectively ensured. When a partition table data record needs to be queried, the application does not pay attention to the existence of a partition routing table; and the DDS performs partition routing table matching, that is, the DDS determines that a query index field in an access request is not partition information, and obtains partition information and the value of the partition information that corresponds to the query index field and that is in the associated partition routing table.

Figure 10:
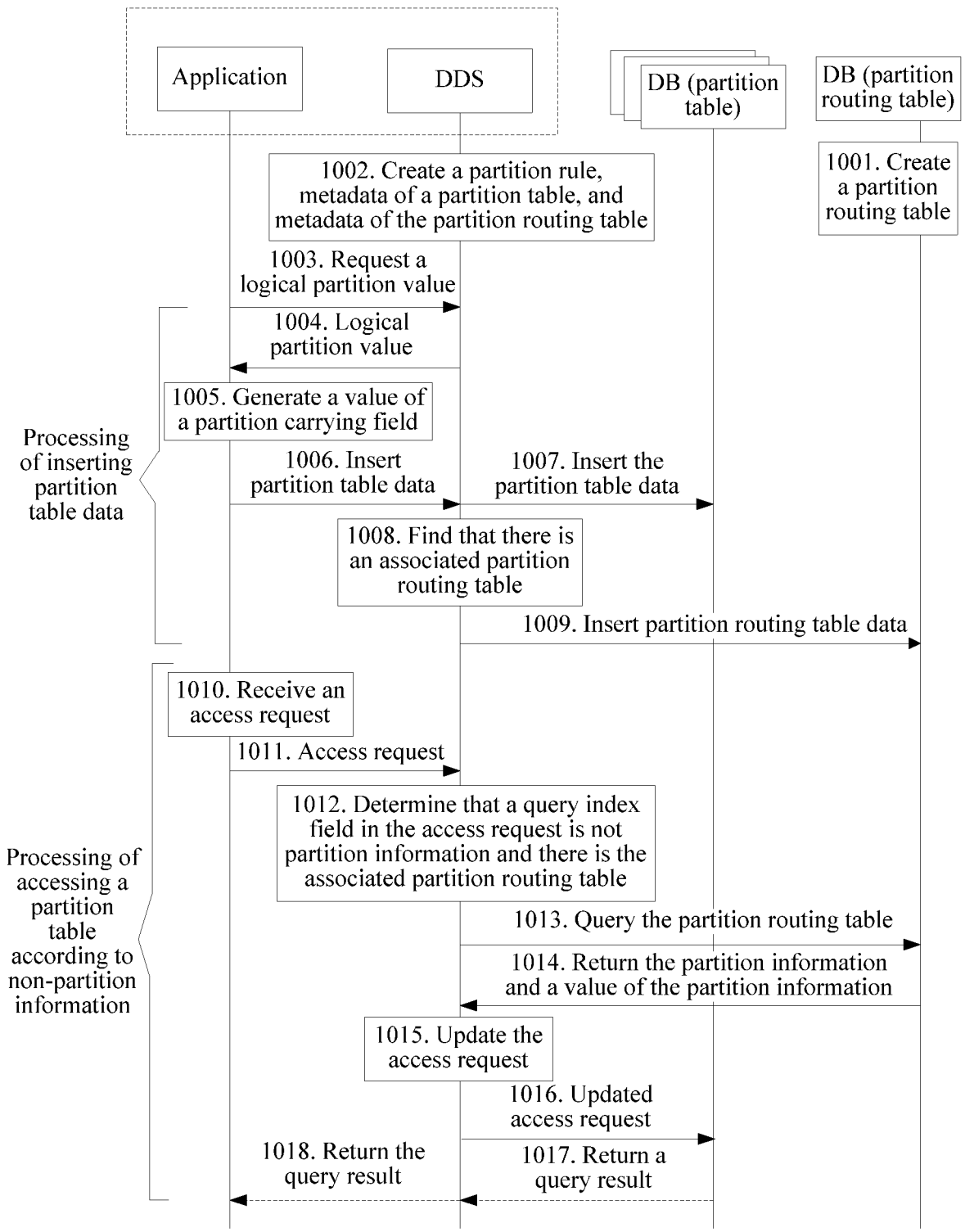
FIG. 10 is a schematic flowchart of another distributed database processing method according to an embodiment of the present invention.

FIG. 10 shows a schematic flowchart of another distributed database processing method. The method includes the following steps.

Step 1001: Plan and create a partition routing table.

Specifically, step tool is the same as step 801 in the embodiment in FIG. 8. For details, refer to the related description in step 801.

Step 1002: Create, on a DDS, a partition rule, metadata of a partition table, and metadata of the partition routing table.

Specifically, the creating, on a DDS, a partition rule and metadata of a partition table is the same as step 802 in the embodiment in FIG. 8. For details, refer to the related description in step 802. For details of the creating metadata of the partition routing table, refer to step 803 in the embodiment in FIG. 8.

Step 1003 to step 1007 are the same as step 804 to step 808 in the embodiment in FIG. 8. For details, refer to the related description in step 804 to step 808.

Step 1008 and step 1009: When inserting the partition table data, the DDS checks whether configuration of an associated partition routing table exists, and if the configuration exists, generates and inserts corresponding partition routing table data.

Step 1010 to step 1018 are the same as step 912 to step 920 in the embodiment in FIG. 9. For details, refer to the related description in step 912 to step 920.

A difference between this embodiment of the present invention and the embodiments in FIG. 8 and FIG. 9 is that, the application does not determine a partition routing table, that is, when a partition table data record needs to be inserted, the DDS determines, according to the metadata of the partition routing table, to insert corresponding partition routing table data. However, when a partition table data record needs to be queried, partition routing table matching is also performed by the DDS. The application is the same as that in the prior art, and does not need to be modified.

Figure 11:
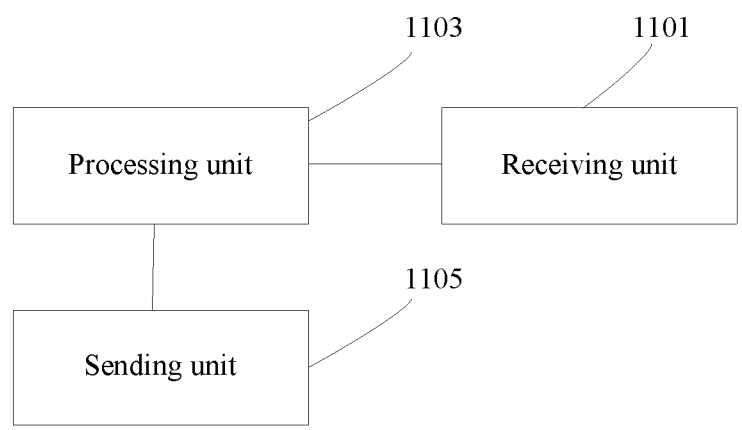
FIG. 11 is a schematic structural diagram of a database processing device according to an embodiment of the present invention.

This embodiment of the present invention further describes a schematic structural diagram of a database processing device whose inventive concept is the same as that in the foregoing method embodiments. As shown in FIG. 11, the database processing device 1100 is configured to perform a function of the application, the DDS, or the device into which the application and the DDS are integrated in the foregoing method embodiments in FIG. 6 to FIG. 10, and includes: a receiving unit 1101, a processing unit 1103, and a sending unit 1105.

The receiving unit 1101 is configured to receive a first access request, where the first access request includes a first query index field, a value of the first query index field, and a to-be-accessed first target field, where the first query index field is non-partition information of a first data table. The access request may be specifically a query request or an update request. The processing unit 1103 is configured to search, according to the first query index field and the value of the first query index field, a partition routing table of the first data table for partition information and a value that correspond to the first query index field, where the partition routing table stores a correspondence between each of partition information of the first data table and a value of the partition information and each of the non-partition information of the first data table and a value of the non-partition information. The sending unit 1105 is configured to send, according to the partition information and the value of the partition information that correspond to the first query index field and the value of the first query index field, the first access request to a database corresponding to the partition information and the value of the partition information.

Optionally, that the processing unit is configured to obtain, from a partition routing table of the first data table, partition information and a value that correspond to the first query index field is specifically: obtaining a partition routing table associated with the first data table; determining, according to the first query index field, a partition routing table that is associated with the first query index field and that is in the partition routing table associated with the first data table; and obtaining, from the partition routing table associated with the first query index field, the partition information and the value of the partition information that correspond to the first query index field.

In a possible implementation, the processing unit is further configured to update the first access request according to the partition information and the value of the partition information that correspond to the first query index field and the value of the first query index field, where an updated first access request includes the partition information, the value, and the to-be-accessed first target field; and that the sending unit is configured to send the first access request to a database corresponding to the partition information and the value of the partition information is specifically: sending the updated first access request to the database corresponding to the partition information and value of the partition information.

Further, before the receiving unit is configured to receive a first access request, the receiving unit is further configured to receive an insertion request, where the insertion request includes to-be-inserted data, and the to-be-inserted data includes the value of the partition information, the value of the first query index field, and a value of the to-be-accessed first target field; the processing unit is further configured to insert the to-be-inserted data into a partition table of the database according to the value of the partition information; and determine that the partition routing table associated with the first query index field exists; the sending unit is further configured to insert the value of the first query index field and the value of the partition information into the partition routing table associated with the first query index field.

Optionally, the receiving unit is further configured to receive a second access request, where the second access request includes a second query index field, a value of the second query index field, and a to-be-accessed second target field, where the second query index field is partition information of a second data table; and the sending unit is further configured to send, according to the second query index field and the value of the second query index field, the second access request to a corresponding database for processing.

It should be noted that, the partition information mentioned in the foregoing includes a partition field or a partition carrying field. A mapping relationship exists between the partition carrying field and the partition field.

In this embodiment, the database processing device 1100 is presented in a form of functional units. The "units" herein may refer to an application-specific integrated circuit (ASIC), a circuit, a processor and a memory for executing one or more software or firmware programs, an integrated logic circuit, and/or another device that can provide the foregoing functions. In a simple embodiment, a person skilled in the art may realize that the database processing device 1100 may use the form shown in FIG. 5. The receiving unit 1101, the processing unit 1103, and the sending unit 1105 may be implemented by using the processor and the memory in FIG. 5. Specifically, the receiving unit 1101 and the sending unit 1105 may be implemented by the processor by executing the interaction module, and the processing unit 1103 may be implemented by the processor by executing the routing module.

An embodiment of the present invention further provides a computer storage medium, configured to store a computer software instruction for implementing the database processing device shown in FIG. 11. The computer software instruction includes a program designed for executing the foregoing method embodiments. By executing the stored program, when a user accesses a database by using a non-partition field, an access request can be prevented from being sent to all databases for processing.

It should be noted that, for ease of description, the foregoing method embodiments are expressed as a series of actions. However, a person skilled in the art should appreciate that the present invention is not limited to the described action sequence, because according to the present invention, some steps may be performed in other sequences or performed simultaneously. In addition, a person skilled in the art should also appreciate that all the embodiments described in the specification are example embodiments, and the related actions and modules are not necessarily mandatory to the present invention.

Although the present invention is described with reference to the embodiments, in a process of implementing the present invention that claims protection, the person skilled in the art may understand and implement another variation of the disclosed embodiments by viewing the accompanying drawings, disclosed content, and the accompanying claims. In the claims, "including" does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in a proper medium and is provided as or used as a part of the hardware together with another hardware, or may use another allocation form such as by using the Internet or another wired or wireless telecommunications system.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, obviously, various modifications and combinations may be made to them without departing from the spirit and scope of the present invention. Correspondingly, the specification and accompanying drawings are merely examples of descriptions of the present invention defined by the accompanying claims, and is considered as any of or all modifications, variations, combinations or equivalents that cover the scope of the present invention. Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method comprising:
   receiving, by a database processing device, a first access request for a first data table, wherein the first access request comprises a first query index field and a value of the first query index field, wherein the first query index field is non-partition information of the first data table;
   obtaining multiple partition routing tables associated with the first data table;
   determining, from the multiple partition routing tables associated with the first data table, a first partition routing table that is associated with non-partition information; and
   obtaining, from the first partition routing table that is associated with non-partition information, partition information and values of the partition information;
   wherein the first partition routing table stores correspondences between the values of the partition information and values of the non-partition information; and
   sending, according to the partition information and the value of the partition information, the first access request to a database corresponding to the partition information and the value of the partition information.

2. The method according to claim 1, wherein the first access request further includes a to-be-accessed first target field, wherein before the sending the first access request to a database corresponding to the partition information and the value of the partition information, the method further comprises:
   updating the first access request according to the partition information and the value of the partition information, wherein an updated first access request comprises the partition information, the value of the partition information, and the to-be-accessed first target field; and
   the sending the first access request to a database corresponding to the partition information and the value of the partition information comprises:
   sending the updated first access request to the database corresponding to the partition information and the value of the partition information.

3. The method according to claim 1, wherein the first access request further includes a to-be-accessed first target field, wherein before the receiving a first access request, the method further comprises:
   receiving an insertion request, wherein the insertion request comprises to-be-inserted data, and wherein the to-be-inserted data comprises the value of the partition information, the value of the first query index field, and a value of the to-be-accessed first target field;
   inserting the to-be-inserted data into a partition table of the database according to the value of the partition information;
   determining that a partition routing table associated with the first query index field exists; and
   inserting the value of the first query index field and the value of the partition information into the partition routing table associated with the first query index field.

4. The method according to claim 1, wherein the method further comprises:
   receiving a second access request, wherein the second access request comprises a second query index field, a value of the second query index field, and a to-be-accessed second target field, wherein the second query index field includes partition information of a second data table; and
   sending, according to the second query index field and the value of the second query index field, the second access request to a database corresponding to the value of the second query index field for processing.

5. The method according to claim 1, wherein the partition information comprises a partition field or a partition carrying field, wherein a mapping relationship exists between the partition carrying field and the partition field when the partition information comprises a partition carrying field.

6. The method according to claim 1, wherein the first access request does not include partition information of the first data table.

7. The method according to claim 1 further, wherein obtaining the partition information and the value of the partition information comprises sending a query request, to a distributed data service (DDS), for querying the partition routing table of the first data table for the partition information and the value of the partition information.

8. The method according to claim 7, wherein sending, according to the partition information and the value of the partition information, the first access request to a database corresponding to the partition information and the value of the partition information comprises sending, to the DDS, an updated first access request comprising the partition information and the value of the partition information, and wherein the DDS send the updated first access request to the database corresponding to the partition information and the value of the partition information.

9. An apparatus, comprising:
a processor; and
a non-transitory computer readable medium connected to the processor and having stored thereon instructions that, when executed, cause the processor to:
receive a first access request for a first data table, wherein the first access request comprises a first query index field, a value of the first query index field, and a to-be-accessed first target field, wherein the first query index field is non-partition information of the first data table;
obtain multiple partition routing tables associated with the first data table;
determine, from the multiple partition routing tables associated with the first data table, a first partition routing table that is associated with non-partition information; and
obtain, from the first partition routing table that is associated with non-partition information, partition information and values of the partition information;
wherein the first partition routing table stores correspondences between the values of the partition information and values of the non-partition information; and
send, according to the partition information and the value of the partition information, the first access request to a database corresponding to the partition information and the value of the partition information.

10. The apparatus according to claim 9, wherein the non-transitory computer readable medium further has stored thereon instructions, that when executed, cause the processor to: update the first access request according to the partition information and the value of the partition information, wherein an updated first access request comprises the partition information, the value, and the to-be-accessed first target field; and
send the updated first access request to the database corresponding to the partition information and the value of the partition information.

11. The apparatus according to claim 9, wherein the non-transitory computer readable medium further has stored thereon instructions, that when executed, cause the processor to:
receive an insertion request, wherein the insertion request comprises to-be-inserted data, and wherein the to-be-inserted data comprises the value of the partition information, the value of the first query index field, and a value of the to-be-accessed first target field;
insert the to-be-inserted data into a partition table of the database according to the value of the partition information;
determine that a partition routing table associated with the first query index field exists; and
insert the value of the first query index field and the value of the partition information into the partition routing table associated with the first query index field.

12. The apparatus according to claim 9, wherein the non-transitory computer readable medium further has stored thereon instructions, that when executed, cause the processor to:
receive a second access request, wherein the second access request comprises a second query index field, a value of the second query index field, and a to-be-accessed second target field, wherein the second query index field includes partition information of a second data table; and
send, according to the second query index field and the value of the second query index field, the second access request to a database corresponding to the partition information of the second data table for processing.

13. The apparatus according to claim 9, wherein the partition information comprises a partition field or a partition carrying field, wherein a mapping relationship exists between the partition carrying field and the partition field when the partition information comprises the partition carrying field.

14. The apparatus according to claim 9, wherein the first access request does not include partition information of the first data table.

15. A distributed database processing device, comprising a processor and a memory, wherein
the memory stores a computer readable program; and
the processor runs the program in the memory, to complete the method according to claim 1.

* * * * *